(12) United States Patent
Verdun

(10) Patent No.: US 8,239,697 B2
(45) Date of Patent: Aug. 7, 2012

(54) PROCESSOR PERFORMANCE STATE CONTROL SYSTEM

(75) Inventor: Gary Joseph Verdun, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 377 days.

(21) Appl. No.: 12/609,121

(22) Filed: Oct. 30, 2009

(65) Prior Publication Data
US 2011/0107115 A1 May 5, 2011

(51) Int. Cl.
*G06F 1/00* (2006.01)

(52) U.S. Cl. ....................................... 713/300
(58) Field of Classification Search .................... 713/300
See application file for complete search history.

(56) References Cited

U.S. PATENT DOCUMENTS

| | | | |
|---|---|---|---|
| 5,737,706 A | 4/1998 | Seazholtz et al. | |
| 5,909,093 A | 6/1999 | van Dinteren et al. | |
| 6,035,374 A | 3/2000 | Panwar et al. | |
| 6,058,466 A | 5/2000 | Panwar et al. | |
| 6,240,521 B1 | 5/2001 | Barber et al. | |
| 6,301,671 B1 | 10/2001 | Boice et al. | |
| 6,414,469 B1 | 7/2002 | Zhou et al. | |
| 6,571,343 B1 | 5/2003 | Johnson et al. | |
| 6,845,456 B1* | 1/2005 | Menezes et al. ............. | 713/320 |
| 6,941,480 B1 | 9/2005 | Dai | |
| 7,072,080 B1 | 7/2006 | Yamamoto | |
| 7,093,036 B2 | 8/2006 | Raghunath et al. | |
| 7,155,621 B2 | 12/2006 | Dai | |
| RE40,236 E | 4/2008 | Johnson et al. | |
| 2002/0036486 A1 | 3/2002 | Zhou et al. | |
| 2002/0083356 A1 | 6/2002 | Dai | |
| 2005/0132096 A1 | 6/2005 | Raghunath et al. | |
| 2005/0235134 A1 | 10/2005 | O'Sullivan | |
| 2006/0000247 A1 | 1/2006 | Moon et al. | |
| 2006/0146769 A1 | 7/2006 | Patel et al. | |
| 2007/0150713 A1 | 6/2007 | Almeida et al. | |
| 2008/0028404 A1 | 1/2008 | Oh et al. | |
| 2008/0047363 A1 | 2/2008 | Arms et al. | |
| 2008/0052493 A1 | 2/2008 | Chang | |
| 2008/0218351 A1 | 9/2008 | Corrado et al. | |
| 2009/0086662 A1 | 4/2009 | Okada | |
| 2009/0199184 A1 | 8/2009 | Arimilli et al. | |

* cited by examiner

*Primary Examiner* — Mohammed Rehman
(74) *Attorney, Agent, or Firm* — Haynes and Boone, LLP

(57) ABSTRACT

A performance state control system includes a processor and a voltage regulator coupled to the processor. The voltage regulator provides a regulated voltage to the processor, as instructed by the processor. A logic circuit coupled to the processor and the voltage regulator detects that the processor is in an operating power state, determines a time that the processor is in the operating state and instructs the processor to execute a performance state determination algorithm when the time that the processor is in the operating state exceeds a pre-determined threshold value.

20 Claims, 5 Drawing Sheets

PROCESSOR PERFORMANCE STATE CONTROL SYSTEM

BACKGROUND

The present disclosure relates generally to information handling systems (IHSs), and more particularly to a hardware based processor performance state (P-state) control system for an IHS.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHS processors generally operate at a number of different operating states defined under an Advanced Configuration and Power Interface (ACPI) specification. These different states relate generally to power states, such as global states (G0-G3), system states (S0-S5), device states (D0-D3), processor states (C0-C3) and performance states (P0-Pn). Processor P-state changes are traditionally controlled by software algorithms running on a host processor. Systems for adjusting processor P-states generally run on a periodic basis (e.g., approximately every 30 to 60 milliseconds) to limit displacing actual work producing code execution on the processor. This, in-turn, minimizes the effectiveness that these programs have on improving processor performance.

Applications, such as office type applications, and some video processing tasks do not task the processor very heavily. Accordingly, this allows the processor to enter and spend most of its time in low power sleep states. In these low power sleep states, the processor dissipates less power than in the active states. But, in these low power sleep states, the processor is unable to execute code. The processor exits these sleep states due to interrupts, bus master activity or more often due to system timer tick interrupts, which typically occur every 15 milliseconds.

The Business Applications Performance Corporation (BAPCo) is a central consortium of IHS developers that develops objective performance benchmarking standards for testing IHS performance using different operating systems and different software applications. Two such performance benchmark systems are MobileMark and SysMark. Traces ran on MobileMark and SysMark applications, which run on a suite of office worker-type applications, allow the processor to spend up to 80% or more of its time in low power sleep states.

Investigations have shown that over 90% of the time when the processor enters an active state, it stays in this active state for a very short period of time (e.g., <~5 milliseconds) before returning to a sleep state. As such, this provides multiple problems for the effectiveness of the P-state adjustment. For example, most of the time that the P-state algorithm runs, a P-state change is not required. Thus, running this code uses unnecessary resources and power. In another example, when a relatively large work load occurs it is likely to be "bursty", needing a lot of processing for a very short period of time. However, the execution duty cycle causes a time delay in executing the P-state change, and thus, the delay misses some of the effective time where the P-state change would have effected performance.

Accordingly, it would be desirable to provide an improved processor P-state control system for an IHS.

SUMMARY

According to one embodiment, a performance state control system includes a processor and a voltage regulator coupled to the processor. The voltage regulator provides a regulated voltage to the processor, as instructed by the processor. A logic circuit coupled to the processor and the voltage regulator detects that the processor is in an operating power state, determines a time that the processor is in the operating state and instructs the processor to execute a performance state determination algorithm when the time that the processor is in the operating state exceeds a pre-determined threshold value.

DETAILED DESCRIPTION

For purposes of this disclosure, an IHS 100 includes any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS 100 may be a personal computer, a network storage device, or any other suitable device and may vary in size, shape, performance, functionality, and price. The IHS 100 may include random access memory (RAM), one or more processing resources such as a central processing unit (CPU) or hardware or software control logic, read only memory (ROM), and/or other types of nonvolatile memory. Additional components of the IHS 100 may include one or more disk drives, one or more network ports for communicating with external devices as well as various input and output (I/O) devices, such as a keyboard, a mouse, and a video display. The IHS 100 may also include one or more buses operable to transmit communications between the various hardware components.

Figure 1:
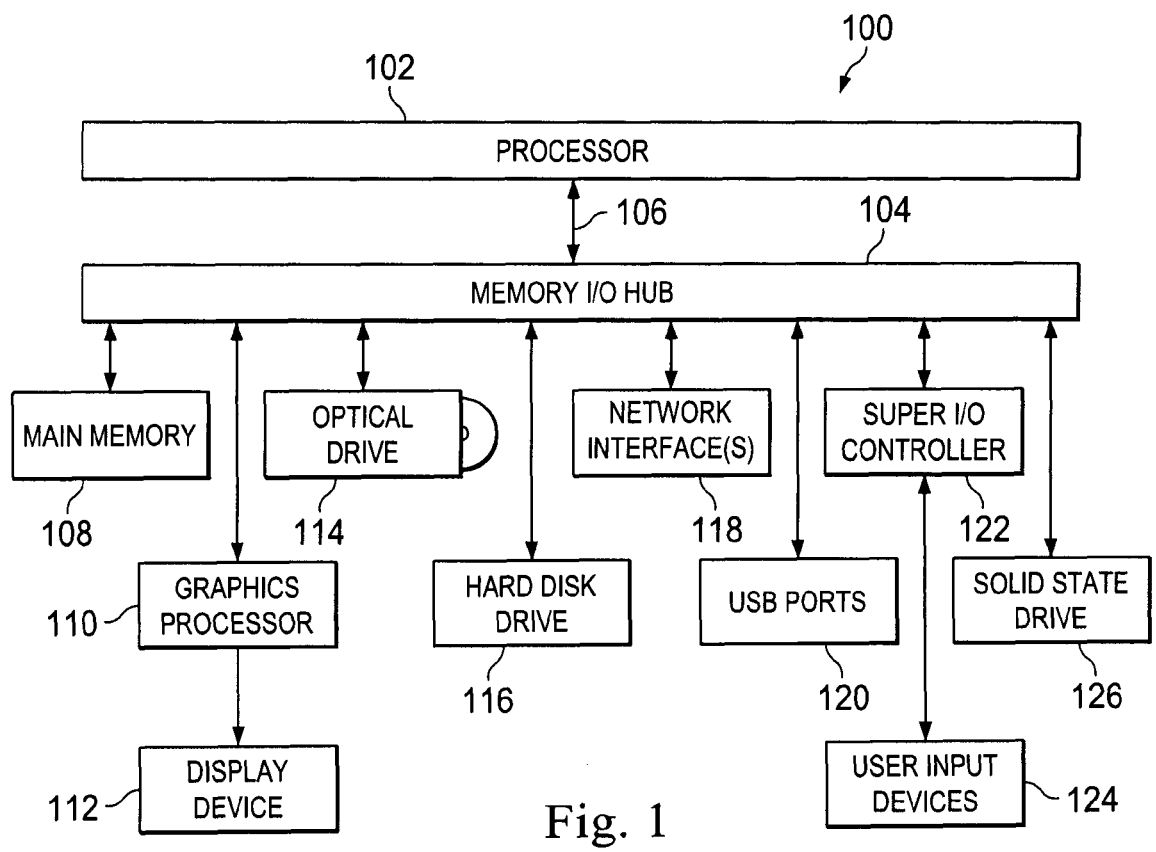
FIG. 1 illustrates a block diagram of an embodiment of an information handling system (IHS).

FIG. 1 is a block diagram of one IHS 100. The IHS 100 includes a processor 102 such as an Intel Pentium™ series processor or any other processor available. A memory I/O hub chipset 104 (comprising one or more integrated circuits) connects to processor 102 over a front-side bus 106. Memory I/O hub 104 provides the processor 102 with access to a variety of resources. Main memory 108 connects to memory I/O hub 104 over a memory or data bus. A graphics processor 110 also connects to memory I/O hub 104, allowing the graphics processor to communicate, e.g., with processor 102 and main memory 108. Graphics processor 110, in turn, provides display signals to a display device 112.

Other resources can also be coupled to the system through the memory I/O hub 104 using a data bus, including an optical drive 114 or other removable-media drive, one or more hard disk drives 116, one or more network interfaces 118, one or more Universal Serial Bus (USB) ports 120, and a super I/O controller 122 to provide access to user input devices 124, etc. The IHS 100 may also include a solid state drive (SSDs) 126 in place of, or in addition to main memory 108, the optical drive 114, and/or a hard disk drive 116. It is understood that any or all of the drive devices 114, 116, and 126 may be located locally with the IHS 100, located remotely from the IHS 100, and/or they may be virtual with respect to the IHS 100.

Not all IHSs 100 include each of the components shown in FIG. 1, and other components not shown may exist. Furthermore, some components shown as separate may exist in an integrated package or be integrated in a common integrated circuit with other components, for example, the processor 102 and the memory I/O hub 104 can be combined together on a single integrated circuit and/or on a single mother board. As can be appreciated, many systems are expandable, and include or can include a variety of components, including redundant or parallel resources.

Embodiments of the present disclosure relate to the Advanced Configuration and Power Interface (ACPI) configuration and power management specification. The ACPI specification defines power states for IHSs, such as global states G0-G3, sleep states S1-S4 in G1, system states S0-S5, device states D0-D3, processor states C0-C3 and performance states P0-Pn, where n is one or more states of performance below P0.

The present disclosure provides an embodiment of a hardware based system for control of IHS processor performance states. For example, a control logic circuit may be coupled to the processor 102 and a voltage regulator that provides regulated voltage to the processor 102. In operation, the control logic detects a processor power state, such as an ACPI processor C-state, using processor state control signals or voltage identification signals that define the required core voltage. A processor performance state (P-state) algorithm code is suppressed unless the processor stays in an active state, such as C0, for longer than a pre-determined programmable threshold time value (e.g., approximately 5 milliseconds). If the processor stays in an active state longer than this pre-determined threshold time value then an interrupt is generated or some other method is used to cause the P-state algorithm to execute and make a decision about changing the P-state (e.g., increasing the P-state from P3 to P2) of the processor. The algorithm may or may not be running on the host processor, but may instead run in logic or some other microprocessor/ microcontroller in the system. The logic may then monitor relative time in sleep vs. active states and make decisions about whether the P-state should or should not run by gating a periodic interrupt or generating one when the ratio of Sleep vs. active state reaches certain thresholds for desired time periods.

Figure 2:
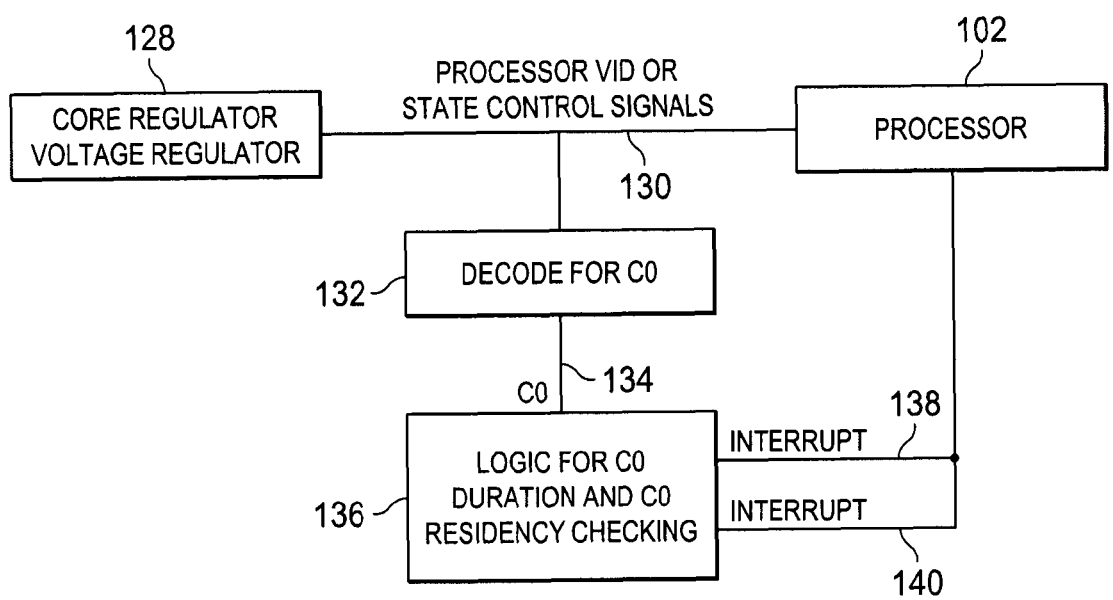
FIG. 2 illustrates a block diagram of an embodiment of a voltage regulator and state logic system for the processor of the IHS of FIG. 1.

FIG. 2 illustrates a block diagram of an embodiment of a voltage regulator 128 and state logic system for controlling the performance states of the processor 102 of the IHS 100. The regulator 128 is coupled to the processor 102 and provides electrical power as a regulated voltage to the processor 102 and more specifically to a core of the processor (not shown). The processor 102 and the regulator 128 are coupled together using a state control signal bus 130, such as a processor voltage identification VID communication bus. The processor VID communication system is a system that communicates between the processor 102 and the regulator 128 and is used to instruct the regulator 128 what value of voltage to provide to the processor 102 core.

A decoder 132 couples to the bus 130. The decoder 132 decodes the signals being communicated across the bus 130 to determine what state in which the processor 102 is operating. For example, the decoder 132 may decode signals on the bus 130 and determine that the processor 102 is operating in the ACPI C0 operating power state. For simplicity, ACPI C0 operating state will be used herein to indicate the processor 102 is in an operating state. However, it is contemplated that different IHS architectures may have different systems of indicating a power state for the processor 102. Accordingly, the decoder 132 is intended to translate whatever signal is available in the system to determine when the processor 102 is operating in the operating power state (e.g., ACPI C0) and provide the indication of the operating state to a logic system 136. The logic system 136 is used for determining processor C0 state duration and C0 residency checking, as described in more detail below. In operation, the logic system 136 determines when the processor is operating in the C0 state for a time greater than a pre-determined threshold and generates a increase P-state interrupt 138, a decrease P-state interrupt 140 or some other trigger condition indicating to the processor 102 to either increase the P-state after operating in the C0 state for more than some threshold time period or to decrease the P-state after not operating in the C0 state for more than a threshold time.

Figure 3:
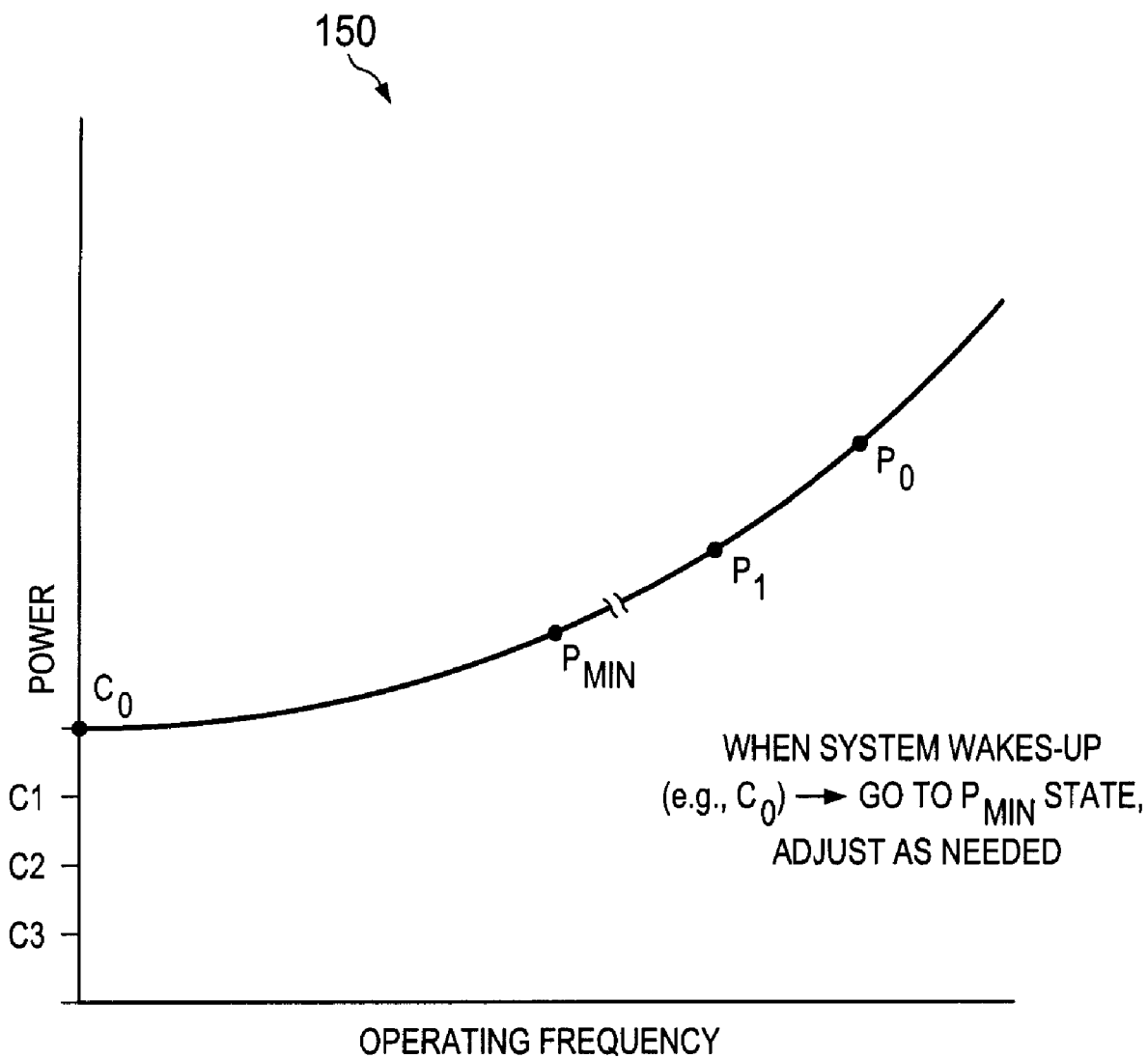
FIG. 3 illustrates a graph of operating frequency vs. power for performance states (P-states) of the processor logic system of FIG. 2.

FIG. 3 illustrates a graph 150 of operating frequency vs. power for performance states (P-states) of the processor logic system of FIG. 2. It is contemplated that in an embodiment, when the processor 102 transitions from either ACPI states C3, C2, or C1 to state C0, as detected by the decoder 132, the logic system 136 operates a counter circuit to determine a time that the processor 102 is operating in the C0 state. After reaching a pre-determined threshold time, the logic system 136 generates a P-state up interrupt 138 for the processor 102. This instructs the processor to execute a P-state algorithm to increase the P-state of the processor 102. As an example, if the processor 102 is operating a P-state P1, the processor 102 will increase the P-state to P0. When the P-state is increased, the system increasing operating frequency of the processor 102 and the processor 102 instructs the regulator 128, via the bus 130, to increase voltage. Conversely, this system may work in reverse to decrease the P-state when no longer operating in the C0 state.

Figure 4:
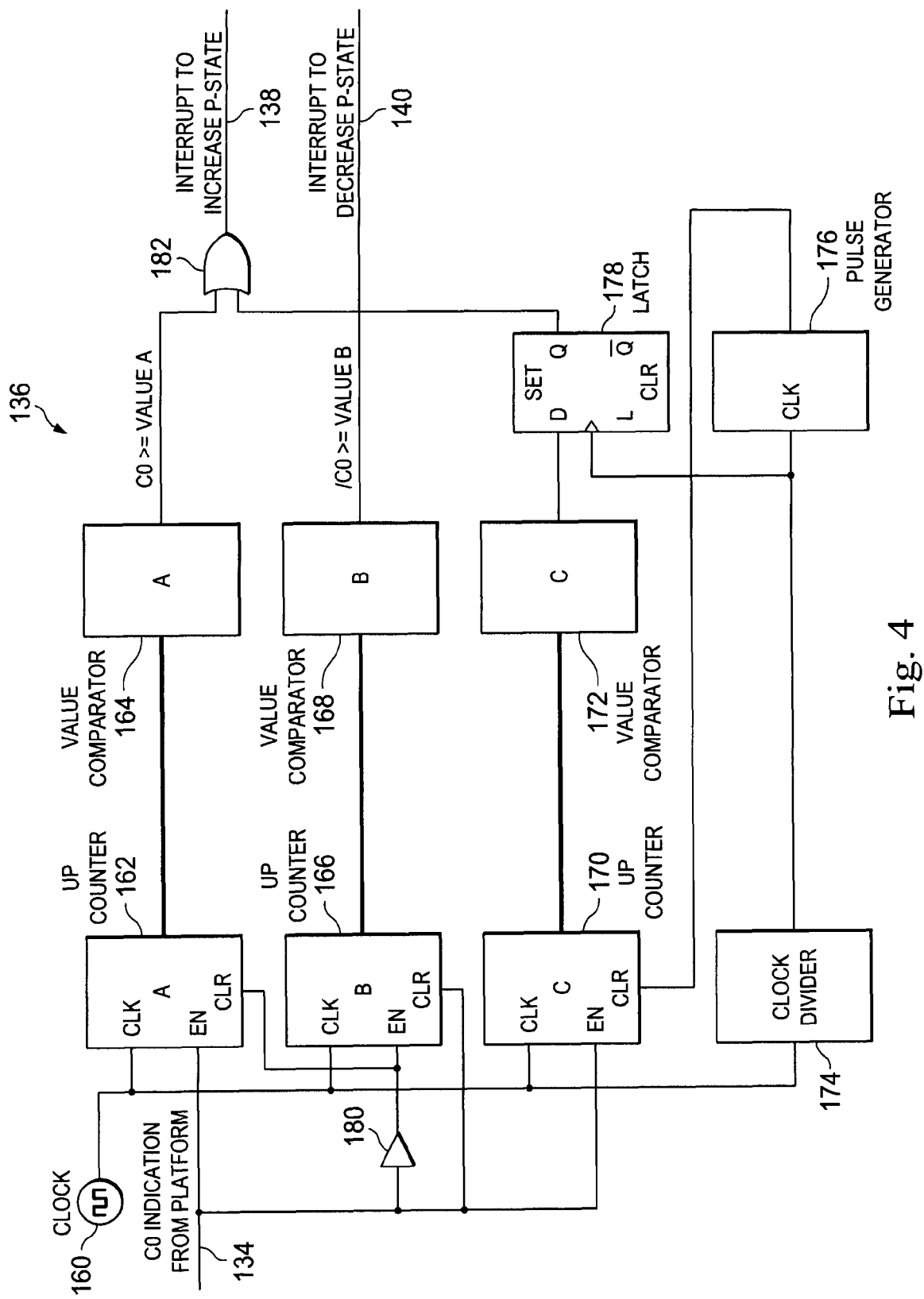
FIG. 4 illustrates a block diagram schematic of an embodiment the state logic system of FIG. 2.

FIG. 4 illustrates a block diagram schematic of an embodiment the state logic system 136. This system 136 includes a clock 160; up counters 162, 166 and 170; value comparators 164, 168 and 172; clock divider 174; pulse generator 176; latch 178; inverter 180; and logical OR gate 182. The logic system 136 receives an input signal 134 from the decoder 132 when the system is operating in the C0 state. The logic system 136 outputs interrupt signals 138 or 140 when the system 136 determines to respectively increase or decrease the P-state.

In operation, up counter A 162, counts anytime the C0 indication 134 is indicating that the processor 102 is in the C0 state. The inverter 180 inverts the C0 signal 134. the up counter A 162 is cleared anytime the processor 102 exits the C0 state into one of the sleep states (e.g., C1-C3). The value comparator A 164 compares the count of up counter A 162 to a threshold value and generates an interrupt signal 138 if the processor 102 stays in C0 for a time longer than the count value. Up counter B 166 counts when the processor 102 is in one of the lower power C states, C1-C3. The count value is compared to a threshold value in value comparator B 168. If the processor 102 is in C1-C3 for a time longer than this threshold, an interrupt signal 140 is generated to cause the processor to transition to a lower P-state.

The up counter C 170, the value comparator C 172, the clock divider 174, the latch 178 and the pulse generator 176 operate as a duty cycle detector. The up counter C 170 counts anytime the C0 signal 134 is at a logic high and stops counting whenever the C0 signal 134 is at a logic low. The value comparator C 172 compares the count value of up counter C 170 and outputs a logic high whenever the counter value is above the set threshold. The clock divider 174 creates a period clock with a rising edge generated at the desired duty cycle interval and causes the latch 178 to output the value of comparator C 172 at each rising clock edge. The pulse generator 176 generates a clear pulse signal for counter C 170, resetting it's value just after the latch 178 latches the count value for the current interval. Using the OR logic gate 182, the output of the latch 178 is OR'd with the output of value comparator A 164 to generate the processor increase P-state interrupt signal 138.

Figure 5:
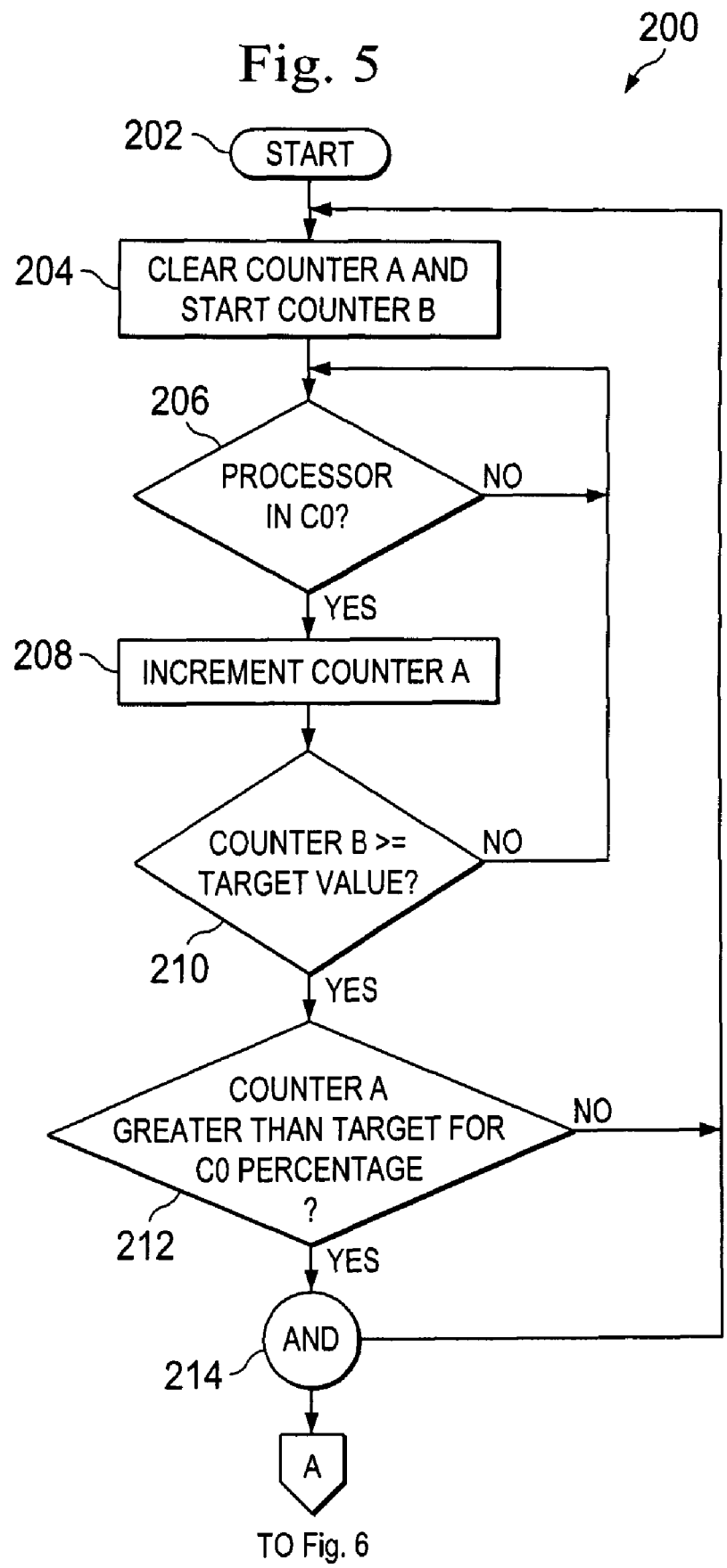
FIG. 5 illustrates a flow chart of an embodiment of a method for counting using the state logic system of FIG. 4.

FIG. 5 illustrates a flow chart of an embodiment of a method 200 for counting using the state logic system 136. The method 200 starts at block 202 where IHS 100 platform is powered up and running. The method 200 proceeds to block 204 where the method 200 clears counter A 162 and starts counter B 166. The method 200 then proceeds to decision block 206, where the method 200 determines whether the processor 102 is in the C0 operating state according to the C0 indication signal 134. If no, the method 200 determines that the processor 102 is not in the C0 state, the method 200 returns to decision block 206. On the other hand, if yes, the method 200 determines that the processor 102 is in the C0 operating state, the method 200 proceeds to block 208 where the method 200 increments counter A 162. The method 200 then proceeds to decision block 210, where the method 200 determines whether counter B 166 has a value greater than or equal to a pre-determined threshold target value. If no, the method 200 determines that counter B 166 does not have a value greater than or equal to the threshold target value, the method 200 returns to decision block 206. On the other hand, if yes, the method 200 does determine that counter B 166 does have a value greater than or equal to the threshold target value, the method 200 proceeds to decision block 212. At decision block 212, the method 200 determines whether counter A 162 is greater than a threshold target value for C0 percentage. If no, the method 200 determines that counter A 162 is not greater than a threshold target value for C0 percentage, the method 200 returns to block 204. On the other hand, if yes, the method 200 determines that counter A 162 is greater than a threshold target value for C0 percentage, the method 200 proceeds to AND block 214 and then returns to block 204. The AND block 214 in FIG. 5 indicates that the P-state change trigger occurs, as discussed below with respect to the method 250 of FIG. 6, and the duty cycle portion of the method 200 of FIG. 5 also begin again. This is also indicated at connector block A on both FIGS. 5 and 6.

Figure 6:
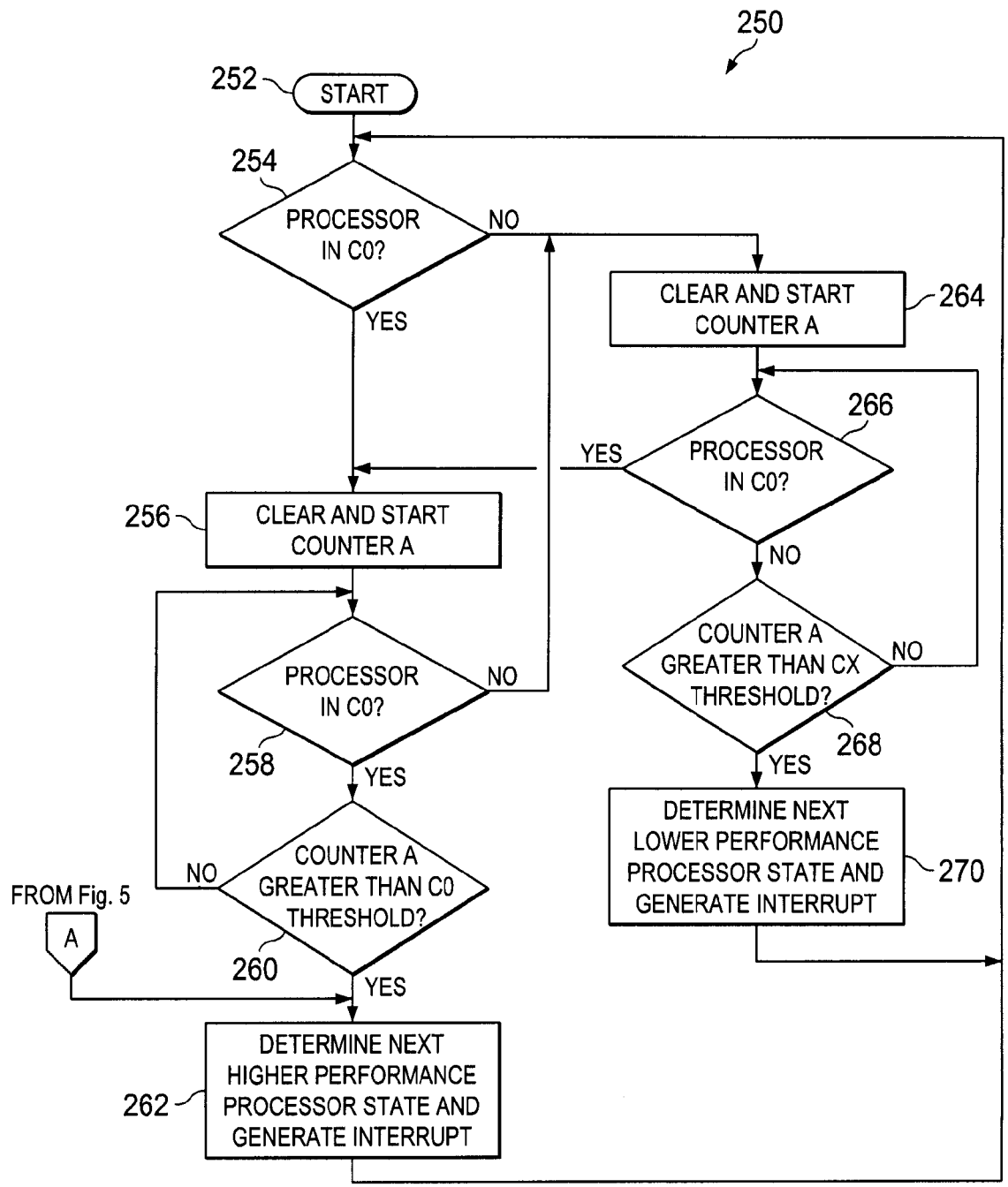
FIG. 6 illustrates a flow chart of an embodiment of a method for changing P-state of the processor using the state logic system of FIG. 4.

FIG. 6 illustrates a flow chart of an embodiment of a method 250 for changing P-state of the processor 102 using the state logic system 136. It is contemplated that methods 200 and 250 may both start substantially simultaneously. The methods 200 and 250 indicate mutually exclusive conditions that my not have dependency on one another.

The method 250 starts at block 252 where IHS 100 platform is powered up and running. The method 250 proceeds to decision block 254 where the method 250 determines whether the processor 102 is in a C0 operating state. If no, the method 250 determines that the processor 102 is not in a C0 state, the method 250 proceeds to block 264, which will be described below. On the other hand, if yes, the method 250 determines that the processor 102 is in a C0 state, the method 250 proceeds to block 256 where the method 250 clears and starts counter A 162. The method 250 then proceeds to decision block 258 where the method 250 determines whether the processor 102 is in a C0 state. If no, the method 250 determines that the processor 102 is not in a C0 state, the method 250 proceeds to block 264, which will be described below. On the other hand, if yes, the method 250 determines that the processor 102 is in a C0 state, the method 250 proceeds to decision block 260 where the method 250 determines whether counter A 162 has a value greater than a pre-determined C0 threshold value. If no, the method 250 determines that counter A 162 does not have a value greater than the threshold value, the method 250 returns to decision block 258. On the other hand, if yes, the method 250 determines that counter A 162 does have a value greater than the threshold value, the method 250 proceeds to block 262 where the method 250 determines a higher P-state and generates the interrupt signal 138. The method 250 then returns to decision block 254.

The discussion now proceeds to block 264 after it was determined in either decision block 254 or decision block 258 that the processor 102 is not in a C0 state. At block 264, the method 250 clears and starts counter A 162. The method 250 then proceeds to decision block 266 where the method 250 determines whether the processor 102 is in a C0 state. If yes, the method 250 determines that the processor 102 is in a C0 state, the method 250 returns to block 256. On the other hand, if no, the method 250 determines that the processor 102 is not in a C0 state, the method 250 proceeds to decision block 268 where the method 250 determines whether counter A 162 has a value greater than a pre-determined Cx threshold value, where Cx is an operating state other than C0, such as ACPI C1, C2 or C3 states. If no, the method 250 determines that counter A 162 does not have a value greater than the threshold value, the method 250 returns to decision block 266. On the other hand, if yes, the method 250 determines that counter A 162 does have a value greater than the threshold value, the method 250 proceeds to block 270 where the method 250 determines a lower P-state and generates the interrupt signal 140. The method 250 then returns to decision block 254.

The disclosure provided herein works for light to medium "bursty" processing loads, but can also be used with heavy processing loads. In addition, the systems provided herein may progress up or down through any number of P-states, or may skip progressions and go directly to another P-State, such as going directly to P0 for full power/frequency performance.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A performance state control system comprising:
   a processor including a plurality of pre-defined power states and a plurality of performance states, wherein the processor is operable to switch between the plurality of performance states in response to a determination made by a performance state determination algorithm;
   a voltage regulator that is coupled to the processor by a bus, wherein the voltage regulator is operable to provides a regulated voltage to the processor in response to a signal from the processor; and
   a performance state control circuit that is coupled to the bus and operable to:
      receive the signal from the processor;
      determine that the processor is in a first power state of the plurality of pre-defined power states using the signal;
      determines a time that the processor is in the first power state; and
      instructs the processor to execute the performance state determination algorithm in response to the time exceeds a pre-determined threshold value, wherein the performance state determination algorithm is not executed if the time does not exceed the pre-determined threshold value.

2. The system of claim 1, wherein the first power state is an Advanced Configuration and Power Interface (ACPI) C0 state.

3. The system of claim 1, wherein the performance state determination algorithm is operable to determines a power level and an operating frequency level for the processor.

4. The system of claim 1, wherein the pre-determined threshold value is approximately 5 milliseconds.

5. The system of claim 1, wherein the performance state control circuit is operable to uses a processor state status signal, control signal or a voltage identification digital (VID) signal to determine that the processor is in the first power state.

6. The system of claim 1, wherein the performance state control circuit is operable to instructs the processor to suppress execution of the performance state determination algorithm when the time is below the pre-determined threshold value.

7. The system of claim 1, wherein the pre-determined threshold value is user adjustable.

8. An information handling system (IHS) comprising:
   a processor that is operable in a plurality of pre-defined power states and plurality of performance states, wherein the processor is operable to switch between the plurality of performance states based on a determination made using a performance state determination algorithm;
   a memory coupled to the processor; and
   a performance state control system, the performance state control system including:
      a voltage regulator coupled to the processor; and
      a performance state control circuit coupled between the processor and the voltage regulator and operable to:
         detect that the processor is in a first pre-defined power state of the plurality of pre-defined power states in response to a communication between the processor and the voltage regulator;
         determine a time period that the processor is in the first pre-defined power state; and
         instruct the processor to execute a performance state determination algorithm when the time period exceeds a pre-determined threshold value, wherein the processor is not instructed to execute the performance state determination algorithm when the time period does not exceed the pre-determined threshold value.

9. The IHS of claim 8, wherein the first pre-defined power state is an Advanced Configuration and Power Interface (ACPI) C0 state.

10. The IHS of claim 8, wherein the performance state determination algorithm is operable to determines a power level and an operating frequency level for the processor.

11. The IHS of claim 8, wherein the pre-determined threshold value is approximately 5 milliseconds.

12. The IHS of claim 8, wherein the performance state control circuit is operable to uses a processor state status signal, control signal or a voltage identification digital (VID) signal to determine that the processor is in the pre-defined power state.

13. The IHS of claim 8, wherein the performance state control circuit is operable to instructs the processor to suppress execution of the performance state determination algorithm when the time period is below the pre-determined threshold value.

14. The IHS of claim 8, wherein the pre-determined threshold value is user adjustable.

15. A method comprising:
   providing a processor that is operable in a plurality of pre-defined power states and a plurality of performance states, wherein the processor is operable to switch between the plurality of performance states based on a determination made using a performance state determination algorithm;
   detecting that the processor is in a first pre-defined power state of the plurality of pre-defined power states in response to communication between the processor and a voltage regulator;
   determining a time period that the processor is in the first pre-defined power state; and
   sending an instruction to execute the performance state determination algorithm when the time period exceeds a pre-determined threshold value, wherein the instruction to execute the performance state determination algorithm is not sent if the time period does not exceed the pre-determined threshold value.

16. The method of claim 15, wherein the first pre-defined power state is an Advanced Configuration and Power Interface (ACPI) C0 state.

17. The method of claim 15, wherein the performance state determination algorithm is operable to determine a power level and an operating frequency level for the processor.

18. The method of claim 15, wherein the pre-determined threshold value is approximately 5 milliseconds.

19. The method of claim 15, wherein a processor state status signal, control signal or a voltage identification digital (VID) signal is used to detect that the processor is in the pre-defined power state.

20. The method of claim 15, including:
   sending an instructing to suppress execution of the performance state determination algorithm when the time period is below the pre-determined threshold value.

* * * * *